United States Patent [19]

Landa

[11] Patent Number: 4,492,300

[45] Date of Patent: Jan. 8, 1985

[54] RESILIENT-FEED BALL INJECTOR FOR MICROBALLISTIC PRINTER

[75] Inventor: Benzion Landa, Edmonton, Canada

[73] Assignee: Savin Corporation, Stamford, Conn.

[21] Appl. No.: 267,468

[22] Filed: May 27, 1981

[51] Int. Cl.³ .............................................. B65G 47/12

[52] U.S. Cl. .................................... 198/443; 221/212; 221/237; 198/526

[58] Field of Search ............... 198/443, 534, 616, 397, 198/805, 526, 540, 550, 690, 381; 400/118; 72/53; 51/319; 221/75, 212, 237

[56] References Cited

U.S. PATENT DOCUMENTS

| | | | |
|---|---|---|---|
| 990,593 | 4/1911 | Ringland et al. | 221/265 X |
| 2,772,811 | 12/1956 | Schaef | 221/263 X |
| 2,862,601 | 12/1958 | Littwin et al. | 198/690 X |
| 2,988,249 | 6/1961 | Wahl | 198/540 X |
| 3,054,170 | 9/1962 | Benichasa | 198/690 X |
| 3,253,739 | 5/1966 | Martin | 198/526 X |
| 3,269,514 | 8/1966 | Daniels et al. | 198/381 |
| 3,491,563 | 1/1970 | Alonso | 72/53 |
| 3,537,580 | 11/1970 | Large et al. | 198/690 X |
| 3,715,056 | 2/1973 | Preston | 198/480 X |
| 3,910,295 | 10/1975 | Fletcher | 133/8 R |
| 4,225,032 | 9/1980 | Gherardi | 198/443 |
| 4,286,886 | 9/1981 | Landa | 400/118 |
| 4,326,644 | 4/1982 | Landa | 221/263 |
| 4,329,070 | 5/1982 | Landa | 400/118 |

*Primary Examiner*—Joseph E. Valenza
*Assistant Examiner*—Kyle E. Shane

[57] ABSTRACT

Apparatus for feeding balls one by one from a cylindrical reservoir in which a rotary saw blade disposed at the bottom of the reservoir is driven to move balls resiliently fed to the intertooth recesses of the blade into the entrance of a passage out of which the balls are fed. Balls are biased into the intertooth blade recesses for reliable high-speed operation by a helical coil spring disposed over the blade in one embodiment or by a plurality of permanent magnets fixedly disposed below the blade recesses in another embodiment.

7 Claims, 4 Drawing Figures

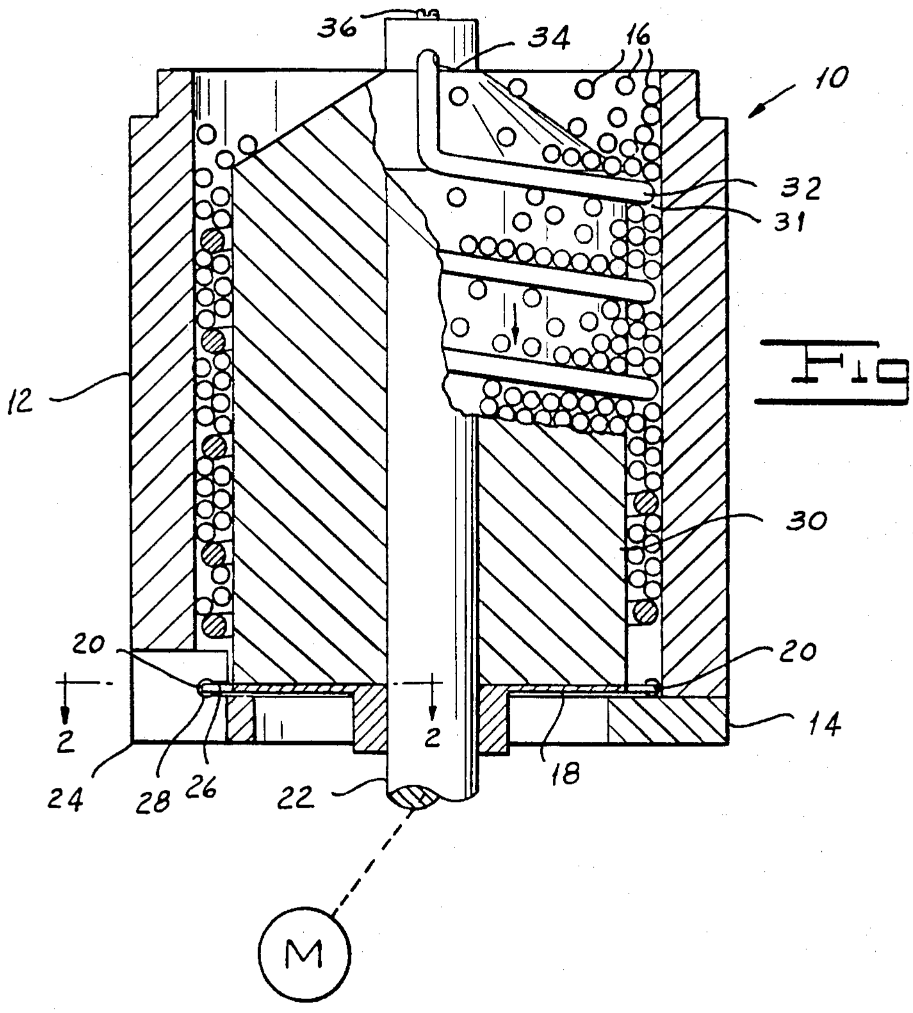
Fig 1
Fig 2
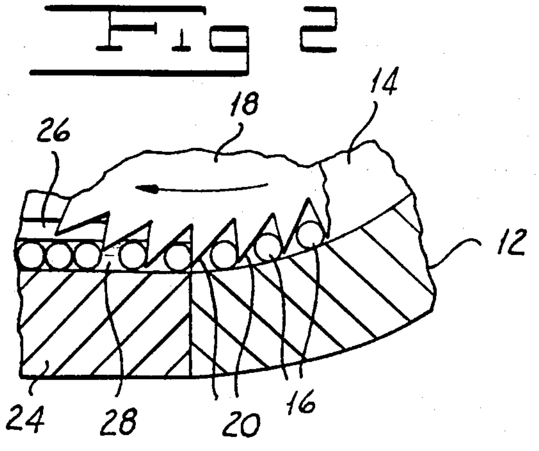

RESILIENT-FEED BALL INJECTOR FOR MICROBALLISTIC PRINTER

FIELD OF THE INVENTION

This invention relates to an improved ball injector especially adaptable for use in a microballistic printer.

BACKGROUND OF THE INVENTION

In application Ser. No. 39,372, filed May 15, 1979, abandoned in favor of continuation application Ser. No. 239,891, filed Mar. 3, 1981, now U.S. Pat. No. 4,351,617, I describe a printer which directs a plurality of small balls about one millimeter in diameter in extremely rapid succession against a printing medium such as a ribbon overlying a sheet of paper. In the ball gun of the printer, which is movable about orthogonal axes for targeting, balls are successively introduced by an injector into a train of balls leading to a resilient breech which is slightly smaller in diameter than the balls and behind which air is maintained under pressure. The lead ball is fired by actuating the injector to feed another ball into the rear of the train to push the lead ball through the breech to the barrel side to allow the pressurized air to expand into the barrel and propel the ball outwardly.

In the ball injector, also described in my copending application Ser. No. 107,885, filed Dec. 28, 1979, now U.S. Pat. No. 4,326,644, balls to be fed fall under the influence of gravity into the spaces between the teeth of a rotary saw blade disposed at the bottom of a cylindrical ball reservoir to be carried along a circular raceway defined by the saw blade and the walls of the reservoir. At a certain point along the raceway, the balls enter a separator which redirects the balls along a straight-line ball-train path tangential to the circular raceway at the point of entry. The separator is formed with a bore corresponding to the desired straight-line path as well as with a slot for receiving the rotary saw blade. The slot is narrower than the ball diameter so that the balls are stripped from the blade teeth and injected into the bore as the blade continues to move along its circular path.

One problem experienced with the above-described ball injector involves the feeding of balls to the recesses between the teeth of the rotary saw blade. At relatively low speeds of operation below a feed rate of about 400 to 500 balls per second, the balls readily enter the recesses between the teeth. At higher speeds of operation, however, the tangential velocity of the teeth of the saw blade relative to the rate of movement of the balls along their generally downward path is such that the teeth will strike the balls as they begin to enter the recesses, deflecting them upwardly. This effect increases with speed so that, at a sufficiently high rotational velocity of the saw blade, no appreciable number of balls are able to enter the intertooth recesses.

SUMMARY OF THE INVENTION

One of the objects of my invention is to provide a ball injector which operates reliably at high rates of speed.

Another object of my invention is to provide a ball injector which is especially adaptable for use in a microballistic printer.

Still another object of my invention is to provide a ball injector which is simple and inexpensive.

Other and further objects will be apparent from the following description.

In general, my invention contemplates apparatus in which balls or other objects to be delivered one by one from a reservoir are biased into the apertures of a movable apertured element. The apertured element is driven to move the apertures into a passage to feed the objects one by one along the passage. Preferably the apertured element comprises a toothed element such as a rotary saw blade disposed at the bottom of a cylindrical ball reservoir. In the preferred embodiment a plurality of permanent magnets disposed at spaced locations beneath the blade periphery are used to bias the balls into the intertooth recesses. Alternatively, a driven helical spring disposed above the blade periphery may be used to urge the balls into the recesses, preferably in combination with a baffle disposed inside the cylindrical reservoir to confine the balls to an annular region and thus prevent the downward force of the driven spring from being dissipated.

BRIEF DESCRIPTION OF THE DRAWINGS

In the accompanying drawings to which reference is made in the instant specification and in which like reference characters are used to indicate like parts in the various views:

FIG. 1 is a section of one embodiment of my resilient-feed ball injector for a microballistic printer or the like.

FIG. 2 is a fragmentary section of the injector shown in FIG. 1 along line 2—2 thereof, rotated counterclockwise through ninety degrees.

FIG. 3 is a section of an alternative embodiment of my resilient-feed ball injector for a microballistic printer or the like.

DESCRIPTION OF THE PREFERRED EMBODIMENTS

Figure 3:
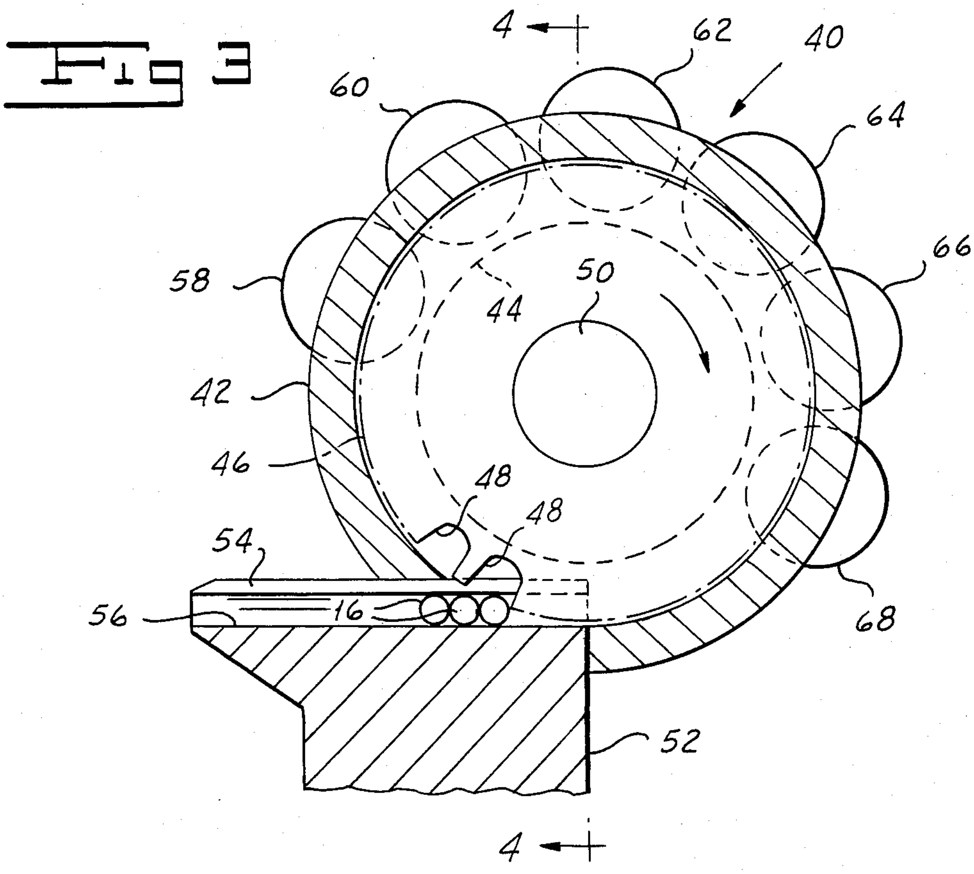

Referring now to FIGS. 1 and 2, one embodiment of my ball injector, indicated generally by the reference numeral 10, includes a generally cylindrical reservoir 12 having a radially inwardly extending ring 14 disposed at its lower end. A rotary saw blade 18 having spaced teeth 20 on its periphery and mounted on a shaft 22 coupled to a motor M is disposed coaxially within the reservoir at the bottom thereof, being spaced slightly from the inner surface of the reservoir 12 as well as from the upper surface of the ring 14. Balls 16 to be fed are supplied to the reservoir formed by cylinder 12 through the open top by any suitable means, such as the ball recycling system shown in my application Ser. No. 39,372, referred to hereinabove.

The spacing of the teeth 20 relative to the diameter of the balls 16 is so selected that each intertooth space accommodates only one ball. As motor M drives the saw blade 18 clockwise as viewed in FIG. 2, the lowermost balls 16 in the reservoir enter the recesses between the teeth 20 to be carried circumferentially around the bottom of the reservoir as shown in FIG. 2. Balls 16 moved along the circular path in this manner enter a ball separator 24, which diverts the balls from their circular path and redirects them along a passage 28 tangential to the circular ball path at the entrance thereof. To strip the balls 16 from the teeth 20, I form the separator 24 with a slot 26 narrower in width than the ball diameter for receiving the blade 18. Balls 16 entering the passage 28 are thus constrained to follow the straight-line path along the passage rather than the circular path followed by the blade 18.

A generally cylindrical baffle 30 mounted on shaft 22 above the saw blade 18 and rotating therewith cooperates with the inner surface of reservoir 12 to form an annular space 31 for directing balls 16 into the recesses between the teeth 20. A helical spring 32, the upper end of which is held in a diametric bore 34 in shaft 22 by a retaining screw 36, extends downwardly into the annular space 31 to the level of the separator 24.

Balls 16 supplied to the top of the annular region are resiliently urged downwardly into the intertooth recesses by the combined action of the driven helical spring 32, which pushes the balls downwardly, and the inner surface of the cylindrical wall 12, which offers frictional resistance to the circumferential movement of balls along with the rotating baffle 30 and spring 32. Baffle 30 serves to prevent the feeding force of spring 32 from being dissipated by inwardly or circumferentially moving balls 16, as well as to reduce the effective size of reservoir 12, and hence the number of balls 16 required to fill the reservoir. Preferably baffle 30 is formed with a sloping, conically shaped top to assist in funneling balls 16 to the annular region.

The ball-feeding apparatus shown in FIGS. 1 and 2 is self-compensating in the sense that at higher speeds of rotation of shaft 22, any balls 16 that are deflected from the intertooth blade recesses will tend to accumulate in the region between the saw blade 18 and the lowest turn of spring 32. These accumulating balls in turn compress the spring 32, increasing the force exerted by the spring 32 on the balls 16 and hence the force with which balls 16 are urged into the intertooth recesses.

Figure 4:
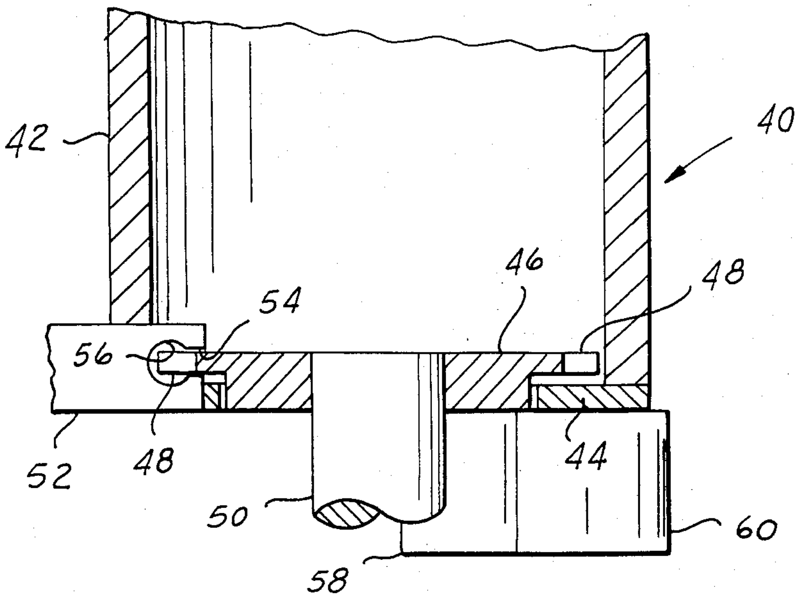
FIG. 4 is a fragmentary section of the injector shown in FIG. 3 along line 4—4 thereof.

Referring now to FIGS. 3 and 4, in an alternative embodiment of my ball injector, indicated generally by the reference numeral 40, a rotary saw blade 46 having spaced teeth 48 and mounted on a shaft 50 is driven by any suitable means (not shown) to move balls 16 circumferentially along a ring 44 at the bottom of a cylindrical reservoir 42. The balls 16 then enter a separator 52 formed with a ball-receiving passage 56 and a slot 54 for receiving the blade 46. I dispose a plurality of permanent magnets 58, 60, 62, 64, 66 and 68 beneath the ring 44 at spaced locations along the circumferential ball path leading to the separator 52, with their magnetic axes parallel to the axis of the reservoir 42.

In the embodiment shown in FIGS. 3 and 4, the balls 16, which are formed in this case of a magnetically permeable material such as tungsten carbide steel, are drawn by the fields of magnets 58 to 68 into the intertooth recesses of blade 46. Since the magnets 58 to 68 exert a direct attractive force rather than an indirect repulsive force on the balls 16, there is no need for any baffle similar to the baffle 30 shown in FIG. 1 to prevent the resilient urging force from being dissipated. If desired, however, one may employ such a baffle (not shown) to reduce the effective size of the reservoir 42.

It will be seen that I have accomplished the objects of my invention. My ball injector, while being simple and inexpensive, operates reliably at high rates of speed and is especially adaptable for use in a ballistic printer. Further, because of the resilient nature of the magnetic or mechanical external biasing force I employ to urge the balls into the intertooth recesses, I minimize the possibility of jamming.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for feeding objects including in combination means forming a passage for receiving said objects, an element formed with an aperture for receiving one of said objects, said element being mounted for movement of said aperture toward said passage, a helical spring having an end disposed adjacent said element, means for driving said spring in such a direction as to move an object supplied to said spring toward said element to bias said object into said aperture, and means for driving said element to feed said object to said passage.

2. Apparatus for feeding balls including in combination means forming a passage for receiving said balls, a rotary element having peripheral teeth and intertooth spacing adapted to receive said balls, said rotary element being mounted for movement of said teeth into said passage, means forming an annular space on one side of said rotary element for holding a supply of said balls, means for resiliently urging said balls in said annular space in the direction of said rotary element, and means for driving said rotary element to feed said balls from said supply into said passage.

3. Apparatus for feeding balls including in combination means forming a passage for receiving said balls, a rotary element having peripheral teeth and intertooth spacings adapted to receive said balls, said rotary element being mounted for movement of said teeth into said passage, means forming a cylindrical space on one side of said rotary element for holding a supply of said balls, a helical spring mounted in said space for rotation with said rotary element, and means for driving said rotary element to feed said balls from said supply to said passage.

4. Apparatus for feeding objects including in combination means forming a passage for receiving said objects, an element formed with an aperture for receiving one of said objects, said element being mounted for movement of said aperture toward said passage, a helical member having an end resiliently disposed adjacent said element, means for driving said member in such a direction as to move an object supplied to said member toward said element to bias said object into said aperture, and means for driving said element to feed said object to said passage.

5. Apparatus for feeding objects including in combination means forming a passage for receiving said objects, a rotary element formed with an aperture for receiving one of said objects, said rotary element being mounted for movement of said aperture toward said passage, means forming an annular space on one side of said rotary element for holding a supply of said objects, means for resiliently urging said objects in said annular space in the direction of said rotary element, and means for driving said rotary element to feed said objects from said supply to said passage.

6. Apparatus for feeding magnetically permeable balls including in combination means forming a passage for receiving said balls, a rotary element having peripheral teeth and intertooth spaces adapted to receive a first plurality of said balls, means mounting said element for rotation about an axis such that said teeth move into said passage, means forming a region for holding a randomly disposed second plurality of said balls, said region opening axially onto said intertooth spaces along a major portion of the periphery of said element, means for exerting an axial magnetic force over a corresponding portion of the periphery of said rotary element tending to hold said first plurality of balls in said intertooth spaces and concurrently to urge said second plurality of balls toward said spaces containing said first plurality of balls, and means for driving said rotary element to feed said first plurality of said balls into said passage.

7. Apparatus as in claim 6 in which said force-exerting means comprises a plurality of magnets disposed along the periphery of said rotary element.

* * * * *